United States Patent [19]

Mumcu

[11] Patent Number: 4,687,837

[45] Date of Patent: Aug. 18, 1987

[54] PROCESS FOR PREPARING PULVERULENT COATING COMPOSITION OF PRACTICALLY UNIFORM GRAIN SIZES AND BASED ON POLYAMIDE HAVING AT LEAST 10 ALIPHATICALLY BOUND CARBON ATOMS PER CARBONAMIDE GROUP

[75] Inventor: Salih Mumcu, Marl, Fed. Rep. of Germany

[73] Assignee: Huls Aktiengelsellschaft, Marl, Fed. Rep. of Germany

[21] Appl. No.: 840,639

[22] Filed: Mar. 18, 1986

[30] Foreign Application Priority Data

Mar. 23, 1985 [DE] Fed. Rep. of Germany ....... 3510689

[51] Int. Cl.⁴ .............................................. C08G 69/46
[52] U.S. Cl. .................................... 528/496; 524/606; 525/432; 528/323; 528/326

[58] Field of Search ...................... 528/496, 326, 323; 524/606; 525/432

[56] References Cited

U.S. PATENT DOCUMENTS 4,334,056 6/1982 Meyer et al. ......................... 528/496

Primary Examiner—Harold D. Anderson
Attorney, Agent, or Firm—Quaintance, Murphy & Presta

[57] ABSTRACT

Polyamide based coating powders having a practically uniform grain size distribution are prepared employing the precipitation procedure provided that the polyamide is dissolved in ethanol at 127° to 135° C. and that the solution is cooled while distilling the ethanol in such a manner that the reactor jacket temperature does not drop below the temperature of the reactor contents until the end of the precipitation stage.

11 Claims, No Drawings

PROCESS FOR PREPARING PULVERULENT COATING COMPOSITION OF PRACTICALLY UNIFORM GRAIN SIZES AND BASED ON POLYAMIDE HAVING AT LEAST 10 ALIPHATICALLY BOUND CARBON ATOMS PER CARBONAMIDE GROUP

CROSS-REFERENCE TO A RELATED APPLICATION

Applicants claim priority under 35 USC 119 for application P 35 10 689.1 filed Mar. 23, 1985, in the Patent Office of the Federal Republic of Germany.

BACKGROUND OF THE INVENTION

The field of the present invention is polyamide powders for the coating of metals.

The invention is particularly concerned with methods for the production of pulverulent coating compositions based on polyamides having at least ten aliphatically bound carbon atoms per carbonamide group by the precipitation method. Copolyamides or a mixture of homopolyamides and copolyamides containing at least 70% of the stated componenets are also useful.

The state of the prior art of producing polyamide powders may be ascertained by reference to U.S. Patents Nos. 3,476,711; 3,900,607; 3,927,141; 3,966,838; 4,143,025; 4,195,162; 4,273,919; and 4,334,056; British Patents Nos. 535,138; 688,771; and 1,392,949; and the Kirk-Othmer "Encyclopedia of Chemical Technology:, 2nd Ed., Vol. 16 (1968), under the section "Polyamide (Plastics)", pages 88-105, particularly page 92 - polylauryllactam (nylon-12), and polyundecanamide (nylon-11), page 101 Solution Processes, and Powder Processing, pages 101-102, the disclosures of which are incorporated herein by reference.

The flame spraying and fluidized bed coating of nylon on a metal base is disclosed in U.S. Pat. No. 3,203,822.

It is known to use polyamide based pulverulent coating compositions in the preparation of varnish type coatings on metals. The coating method is performed by the melt film procedure, namely the fluidized bed method, the flame spray process or the electrostatic coating method. The polyamide powders are obtained by precipitating the polyamide from solutions as disclosed in British Patent No. 688,771, or by grinding the polyamide granulate, preferably at low temperatures and in an inert gas atmosphere as disclosed in U.S. Pat. No. 4,273,919.

British Patent No. 688,771 discloses the precipitation of polyamide powders from ethanol by cooling the hot polyamide solution by external means or by merely letting it stand to cool. It is only by forced cooling or by letting the hot polyamide solution stand to cool that powders with a high proportion of fine grains are obtained, which lead to dust generation in the fluidized bed. Lastly such a procedure causes undesired agglomerations which subsequently require abrasion or grinding to be put into the required powder size. Moreover such methods result in nonreproducible batches which vary in particle size, bulk density, and molecular weight.

It is further known to manufacture polyamide powders by grinding polyamides of low molecular weights and by obtaining the desired viscosity in the powders so made by heating them to temperatures below the melting point as disclosed in U.S. Pat. No. 3,471,711.

Polylauryllactam powders also are prepared by this known method and are put to use again by known procedures as disclosed in Chem. Ind. November 1968, pages 783 to 791, and Modern Plastics, February 1966, pages 153 to 156. Because the polylauryllactam powders do not always meet the conditions of high elasticity, good edge coating, smooth surface, resistance to alkaline aqueous solutions, and frequently emit thick smoke during processing, among other drawbacks, the most diverse improvements have already been disclosed, such as polylauryllactam powders containing plasticizers, as disclosed in U.S. Pat. No. 3,900,607; or powders made of a mixture of copolyamides containing homopolylauryllactam and lauryllactam, as disclosed in British Patent No. 1,392,949, or those containing polyamides having N-alkoxymethyl groups in addition to acidically reacting catalysts, as disclosed in U.S. Pat. No. 3,966,838, or those with mixtures of polyamides having 8 to 11 aliphatically bound carbon atoms per carbonamide group, aminoplasts bearing alkoxyalkyl groups and acidically reacting catalysts, as disclosed in U.S. Pat. No. 3,927,141. These powders have good properties in specific instances but fall short of meeting all the requirements.

An improved method is described in U.S. Pat. Nos. 4,143,025 and 4,195,162. This procedure, however, still falls short because a grinding method is employed to prepare pigment-free powders and the precipitation method must be used to make pigmented powders. Lastly, this method presumes the use of polylauryllactam granulates which were prepared exclusively by hydrolytic polymerization in the presence of specified amounts of phosphoric acid.

U.S. Pat. No. 4,334,056 discloses a further improved method for preparing coating powders by the precipitation procedure comprising a method of producing polyamide powder from polyamide having a relative viscosity of 1.4 to 1.8 as measured in 0.5% meta-cresol solution at 25° C. and at least 70% of said polyamide consisting of polyamide with at least ten aliphatically bound carbon atoms per carbonamide group, comprising:

(a) dissolving said polyamide in at least twice the amount by weight of ethanol in a closed vessel at a temperature between about 130° to 150° C. to form a solution of said polyamide;

(b) cooling said solution to a precipitation temperature between about 100° to 125° C. and ceasing said cooling at said precipitation temperature;

(c) precipitating said polyamide powder from said cooled solution of (b) polytropically with agitation and under an inert gas atmosphere; and (d) separating said precipiatated polyamide powders of (c) from said ethanol.

Coating powders prepared by the precipitation method have a somewhat more advantageous distribution of grain size than those made by grinding, and furthermore the granins are also somewhat smoother at the edges. Nevertheless they must be graded by screening or sifting to remove the interfering portions of small or large particles.

SUMMARY OF THE INVENTION

Having in mind the limitations of the prior art it is an object of the present invention to provide a method of preparing polyamide based coating powders having a narrow spectrum of grain sized and with the particles assuming spherical shapes. Lastly, the powders so made shall retain other properties at least as good as heretofore. Because the known coating powders for the fluidized bed method fail at coating thicknesses less than 200 microns, this problem is also overcome in the object of the present invention.

The problem is solved by preparing coating powders of practically uniform grain size and based on polyamides having at least ten aliphatically bound carbon atoms per carbonamide group or copolyamides or a mixture of homopolyamides and copolyamides containing at least 70% of the stated components, employing the precipitation procedure, wherein the polyamide is dissolved in ethanol at temperatures between 127° and 135° C. and by cooling the solution while distilling ethanol in such a manner that until the end of the precipitation stage the reactor jacket temperature does not drop below the temperature of the reactor contents.

DESCRIPTION OF THE PREFERRED EMBODIMENTS

Coating compositions in pulverulent form and having a practically uniform grain size are those which meet the following conditions:

98% by weight of the powders may deviate by at most 40% from the average grain diameter. In other words, for an average grain diameter illustratively 100 microns, the deviation from the average grain size at most may be 40 microns. In the heretofore known methods this range is +/−100 microns for a narrow grain size distribution.

Accordingly, applicable polyamides for the process are polyundecanoic acid amide, polylauryllactam (11 aliphatically bound carbon atoms per carbonamide group) and polyamides having more than 11 aliphatically bound carbon atoms per carbon amide group, preferably polylauryllactam. Furthermore, corresponding copolyamides which contain at least 70% by weight of the stated components. The comonomers they contain, accordingly may be from 0 to 30% of one or more comonomers such as caprolactam, hexamethylenediamine, dodecamethylenediamine, isophoronediamine, trimethylhexamethylenediamine, adipic acid, azelaic acid, sebacic acid, dodecanoic diacid, and aminoundecanoic acid. The homopolyamides or copolyamides designated below as polyamides are used in the form of granulates having a relative solution viscosity between 1.4 and 1.8 as measured in 0.5% meta-cresol solution at 25° C. Preferably, however, they are prepared by hydrolytic polymerization. Nevertheless it is also possible to make use of polyamides made by acidolytic or activated anionic polymerization. The polyamides obtained by hydrolytic polymerization can be controlled or uncontrolled with respect to their molecular weights, that is, they may be prepared also in the absence of any chain stabilizers such as acetic acid, benzoic acid, adipic acid, azelaic acid, sebacic acid, and dodecanoic diacid.

The polylauryllactam used is advantageously prepared in the presence of 0.3 to 0.7% by weight of phosphoric acid, 2 to 10% by weight water at temperatures between 265° and 300° C. in the absence of any chain stabilizers and under its own pressure. The phosphoric acid also can be added as a whole after the precipitation or in part during the polymerization and following precipitation. Appropriately extraction by means of ethanol or methanol comes first.

Solely ethanol is used as the solvent for the precipitation procedure of the present invention. Besides water free ethanol, the ethanol also can be conventional alcohol which may contain up to 10% by weight of water and typical denaturants such as methylethylketone, petroleum ether, or pyridine. The ethanol is used in such proportions that the polyamide share is at most 25% by weight and preferably this share is between 10 and 18% by weight. Powders for the electrostatic procedure advantageously are precipitated in the lower range of concentration (10 to 15%) while those for the fluidized bed method are precipitated in the upper range of concentration (15 to 18%).

To implement the process, the temperature of the mixture of polyamide and ethanol is appropriately raised in jacket heated agitation vessels to the temperature of dissolution which is between 126° and 140° C., preferably between 127° and 130° C. The rate of raising the temperature is not critical. Preferably the temperature of dissolution is kept constant at most for one hour. The heating can be carried out by heat transmitters in the jacket or preferably by means of low pressure steam or even high pressure steam in larger vessels. The rate of agitation during the dissolution process practically is without effect on the grain size distribution.

The clear solution is cooled with stirring and distillation of the ethanol under its own pressure and removal of the cold condensate at a rate of 3° to 30° C. an hour, preferably 10° to 20° C./hour. The jacket temperature is so regulated until the end of the precipitation stage that it does not drop below the inside temperature.

Observing those conditions, the polyamide time of precipitation is less than 2 hours, preferably between 5 minutes and 1 hour. The temperature of precipitation can be noted during cooling of the solutions by the temperature curve of the inside pivoting to the horizontal (kink). The temperature of precipitation is in the range from 110° to 120° C., preferably between 112° and 118° C.

Preferably the actual stage of precipitation (the horizontal part of the temperature curve) is carried out isothermally to still further narrow the grain size spectrum. The temperature of precipitation can be easily kept constant by adapting the rate of ethanol distillation to the heat of precipitation being released. The end of the precipitation stage is noted by a strongly dropping inside temperature. At least 70% of the polyamide used are precipitated in the precipitation stage proper.

The average grain size is mainly determined by the angular speed (rpm) during the cooling and agitation stage. Suitable stirrer means are horseshoe mixers, propeller mixers, straight arm paddle agitators, and preferably flat blade paddle agitators varying in angular speed. The paddle agitator dimensions are such that the diameter is in a ratio of 1:2 to the reactor diameter.

A low angular speed is selected for preparing fluidized bed powders with average grain diameters of 100 microns, i.e., with a grain size spectrum of 60 to 140 microns or narrower. As regards the finer electrostatic powders having an average grain diameter of 50 microns, i.e., with a spectrum from 30 to 70 microns, or narrower, the flow is turbulent in the mixer and this turbulent flow is achieved by a higher angular speed and suitable flow breaking means.

Jacket cooling is possible after the precipitation stage without there being danger of forming a polymer film on the reactor wall.

The suspension is dried under reduced pressure and wall temperatures below 100° C. with gentle mechanical motion, for instance in slowly moving paddle or tumble driers up to the running capability of the product which sets in at 20% ethanol moisture. When this running capability is reached, the mechanical motion can be intensified and the drier temperature may be raised above 100° to 150° C.

Accordingly, the process of the invention makes it selectively possible to prepare both fluidized bed powders and electrostatic powders directly and with a narrow spectrum of grain sizes. No dusting takes place with the fluidized bed powders of the invention in the fluidized bed. They run well as metal coatings even for thicknesses of 120 to 200 microns, which are impossible with fluidized bed powders of the state of the art. As a rule the coatings made by the powders of the present invention are excellent regarding the frequency of bubbles, elasticity and edge coating, also resistance to aqueous alkaline solutions. Their mechanical strength is high.

The precipitation also can be carried out in the presence of such pigments as titanium dioxide, lampblack, $BaSO_4$, ZnS, cadmium red, iron oxide, or stabilizers such as 4-hydroxy-3,5-di-tert.-butylphenyl propionic acid, 4-hydroxy-3,5-di-tert.-butylphenyl propionic acid hexamethylenediamine bisamide, -propionic-acid esters having an aliphatic alcohol with 1 to 18 carbon atoms, trisalkylphenylesters, trisalkylesters, trisarylesters or mixed esters of phosphoric acid of which the alkyl residue contains from 1 to 16 carbon atoms and is a straight or branched chain, or in the presence of surfactants.

Advantageously those pigments are used which nucleate little or not at all the polyamide crystallization. The nucleating effect of the pigment is ascertained by the following procedure. (It is also possible to use the calorimeter described in Chem. Ing. Technik 51 (1979), No. 8, page 823): A 5-liter autoclave with a flat paddle mixer is used where the diameter ratio of the autoclave to paddle mixer =2/1 and the autoclave is converted by adequate thermal insulation into a calorimeter. A mixture of 2,400 g of ethanol (denatured by methylethylketone, water content 1% by weight), 400 grams of polyamide granulate (for instance polyamide 12) and 32 grams of pigment is placed into this calorimeter and the polyamide is dissolved with stirring (160 rpm) within one hour at 145° C. Thereupon the circulation of the heating medium in the jacket is shut off and the inside temperature is lowered by distilling the ethanol into an external receiver at a rate of 60° C./hour down to 110° C.

Next the distillation is stopped and the inside temperature no longer is regulated. Precipitation takes place within thirty minutes. The higher the nucleating effect of the pigment on polyamide crystallization, the higher the achievable inside temperature $T_{max}$. Where no pigment is used, the temperature typically rises to $T_N = 110.4°$ C.

The expression $\Delta T = T_{max} - T_N$ is a measure of the nucleating effect of the pigment. $T_{max}$ and hence $\Delta T$ strongly depend on the polyamide used.

In the process of the invention, applicable pigments are those with $\Delta T \leq 3°$ C. and especially with $\Delta T$ between 0.5 to 2° C. Pigments having $\Delta T > 3°$ C. cause excessive spreading of the grain size spectrum where the finest grain portion is less than 10 microns.

SPECIFIC EXAMPLES

EXAMPLE 1

300 kg of polyamide 12 prepared in the presence of 1% molar of dodecanoic diacid (referred to lauryllactam) and with a relative solution viscosity of 1.65 are heated together with 2,500 liters of ethanol denatured by methylethylketone and with a water content of 1% in a 3 m3 reactor (diameter: 1,600 mm) and are kept for 1 hour at 129° C. Then the solution is cooled by distillation of the ethanol into an external receiver at an average rate of 12° C./hour and an agitator angular speed of 50 rpm (paddle agitator with a diameter of 800 mm), the jacket temperature being regulated in such a manner that it does not drop below the inside temperature.

Precipitation begins at the temperature of 115° C. which is noted by the rise of the internal temperature. The distillation output is then raised until the inside temperature stays at 115°+/−0.3° C. until the end of precipitation, which is noted by a strong drop of the internal temperature. The precipitation lasts 18 minutes and the amount of distilled ethanol is a total of 500 liters. Thereupon the distillation is stopped and the suspension so obtained is cooled by means of the reactor jacket to 45° C. and dried in a paddle drier down to a residual humidity of 0.15% by weight.

The distribution of the grain size is measured by means of an air jet sieve and is very narrow:

| Grain Size in Microns | % By Weight |
| --- | --- |
| <60 | 0 |
| <80 | 1.2 |
| <100 | 48 |
| <120 | 99 |
| <140 | 100. |

The powder generates no dust in the fluidized bed. The powder is used to coat 1 mm sheetmetal sheets previously raised to 380° C. in a circulating air oven. Starting at coating thicknesses of 110 microns, pore free coatings with good running properties were achieved.

EXAMPLE 2

The procedure is the same as in Example 1 except for adding 45 kg of $TiO_2$ pigment with a weakly nucleating effect ($\Delta T = 1.2°$ C.) to the reactor jointly with the granulate.

To obtain approximately the same average grain size, the agitator speed had to be set to 44 rpm. A non-dusting powder with a very narrow grain size spectrum is obtained which makes possible pore free coatings from 120 microns.

COMPARISON EXAMPLE 1

The dissolution temperature is set at 145° C. and the other conditions of Example 1 are retained. In order to observe the mean grain size, the stirrer speed had to be adjusted in this case to 35 rpm. The powder exhibits a wide spectrum of grain sizes and, accordingly, requires grading to prevent dusting. No pore free coatings are obtained for thicknesses less than 200 microns.

COMPARISON EXAMPLE 2

The polyamide used in Example 1 was dissolved at 129° C. The further implementation is similar to that of Example 1 of U.S. Pat. No. 4,334,056, the angular speed being adjusted to 20 rpm when the inside temperature became 117° C. and the jacket temperature being set to 111.5° C. and the solution being at a pressure of 2 bars of $N_2$. The powder evinces a bimodal grain distribution with a high portion of finest grains causing strong dusting in the fluidized bed. Following grading, these powders allow pore free coatings for thicknesses above 200 microns.

COMPARISON EXAMPLE 3

This example is carried similarly to the process of U.S. Pat. No. 4,334,056. In lieu of the polyamide used therein, however, the polyamide of this Example was prepared in the presence of 1% molar dodecanoic diacid (referred to the lauryllactam used). [Example 1]

The following table shows the results from the Examples and the Comparision Examples. It is clear that the objects of the invention can only be achieved by the powders of the invention.

TABLE

| | Pigment | Nucleating effect T (°C.) | Temperature of dissolution (°C.) | Agitator (rpm) | Rate of Cooling (°C./hour) | Time of Precipitation (min) | Temperature of Precipitation (°C.) | % by weight of grain proportions | | | | | | | Dusting | Pore free coating |
|---|---|---|---|---|---|---|---|---|---|---|---|---|---|---|---|---|
| | | | | | | | | <40 μm | <60 μm | <80 μm | <100 μm | <120 μm | <140 μm | <160 μm | | |
| Example | | | | | | | | | | | | | | | | |
| 1 | — | — | 129 | 50 | 12 | 18 | 115 | 0 | 0 | 1.2 | 48 | 99 | 100 | 100 | no | from 110 μm |
| 2 | TiO$_2$ | 1.2 | 129 | 44 | 12 | 12 | 116 | 0 | 0 | 0 | 57 | 100 | 100 | 100 | no | from 120 μm |
| Comparison Ex. | | | | | | | | | | | | | | | | |
| 1 | — | — | 145 | 35 | 12 | 50 | 112 | 1.3 | 5 | 19 | 52 | 80 | 90 | 99 | yes | from 200 μm |
| 2 | — | — | 129 | 20 | 8 | 10 | 117 | 20 | 22 | 35 | 54 | 68 | 79 | 90 | yes | after grading from 200 μm |
| 3 | — | — | 140 | 20 | 8 | 720 | 116–117 | 1.3 | 7 | 20 | 51 | 78 | 87 | 99 | yes | from 200 μm |

What we claim is:

1. A method of producing polyamide powder from polyamide having a relative viscosity of 1.4 to 1.8 as measured in 0.5% meta-cresol solution at 25° C. and at least 70% of said polyamide consisting of polyamide with at least 10 aliphatically bound carbon atoms per carbonamide group, comprising:
    (a) dissolving said polyamide in ethanol in a closed vessel having a heated wall and an external receiver at a temperature between about 127° to 135° C. to form a solution of said polyamide having a concentration of said polyamide up to about 25% by weight in said solution;
    (b) distilling and removing said ethanol into said external receiver at a rate sufficient to cool said solution 3° to 30° C. per hour;
    (c) simultaneously with step (b) maintaining said heated wall at a temperature equal to or greater than any concurrent solution temperature;
    (d) continuing steps (b) and (c) through a precipitation temperature of 100° to 120° C. and thereby precipitating said polyamide; and
    (e) separating said precipitated polyamide powder of (d) having 98% by weight of said powder deviating up to about 40% from an average grain diameter.

2. The method of claim 1, wherein said concentration of step (a) is 10 to 18% by weight.

3. The method of claim 2, wherein said concentration of step (a) is 10 to 15% by weight.

4. The method of claim 2, wherein said concentration of step (a) is 15 to 18% by weight.

5. The method of claim 3, wherein said precipitated polyamide powder has a grain size spectrum of 60 to 140 microns and useful for fluidized bed powders.

6. The method of claim 4, wherein said precipitated polyamide powder has a grain size spectrum of 30 to 70 microns and useful for electrostatic powders.

7. The method of claim 1, wherein said rate of cooling of step (b) is 10° to 20° C. per hour.

8. The method of claim 1, wherein step (d) is carried out isothermally at a temperature of 112° to 118° C.

9. The method of claim 8, wherein step (d) is carried out in less than 2 hours.

10. The method of claim 9, wherein step (d) is carried out between 5 minutes and 1 hour.

11. The method of claim 1, further comprising the addition of a titanium dioxide pigment into said solution having a nucleating effect of ΔT less than or equal to 3° C. wherein the nucleating effect is defined by the formula $$\Delta T = T_{max} - T_N$$

wherein $T_{max}$ is the precipitation temperature for the solution of polyamide and pigment; and $T_N$ is the precipitation temperature for the solution of polyamide free of pigment.

* * * * *